(12) United States Patent
Robineau (10) Patent No.: US 6,195,910 B1
(45) Date of Patent: Mar. 6, 2001

(54) DEVICE FOR COUPLING AN EXHAUST TUBE TO AN EXHAUST PORT

(76) Inventor: Claude Robineau, 175, Grand Rang St-François, St-Hyacinthe, Québec (CA), J2S 7A9

( * ) Notice: Subject to any disclaimer, the term of this patent is extended or adjusted under 35 U.S.C. 154(b) by 0 days.

(21) Appl. No.: 09/460,143

(22) Filed: Dec. 13, 1999

(30) Foreign Application Priority Data

Dec. 15, 1998 (GB) .............................................. 9827454.1

(51) Int. Cl.$^7$ ...................................................... F26B 5/04
(52) U.S. Cl. .................. 34/417; 34/607; 34/235
(58) Field of Search .............................. 34/417, 601, 602, 34/604, 606, 607, 134, 235; 55/357, 490; 96/356, 367; 454/347, 359

(56) References Cited

U.S. PATENT DOCUMENTS

| | | | |
|---|---|---|---|
| 3,157,391 | * 11/1964 | Angelone | 34/607 |
| 4,334,461 | * 6/1982 | Ferguson et al. | 34/235 X |
| 4,530,170 | * 7/1985 | Green | 34/235 X |
| 4,989,347 | * 2/1991 | Kretchman | 34/607 |
| 5,257,468 | * 11/1993 | Lebrun | 34/235 |
| 5,645,482 | * 7/1997 | Moss et al. | 34/235 X |
| 5,970,623 | * 10/1999 | Tuggle | 34/134 |
| 6,098,312 | * 8/2000 | Tuggle | 34/607 |

* cited by examiner

Primary Examiner—Stephen Gravini (57) ABSTRACT

A coupling device for coupling a conventional dryer flexible exhaust tube to the wall mounted exhaust port. The coupling device includes first and second coupling components each having corresponding first and second base plates with first and second exhaust apertures extending through the first and second base plates. The dryer flexible exhaust tube is attached on one of its end to a dryer outlet port and at its other end to an attachment flue extending from the first base plate in fluid communication with the first exhaust aperture. A second flue extends from the second base plate in fluid communication with the second exhaust aperture. The second flue is used for mounting the second coupling component to a wall exhaust aperture extending through a partition wall adjacent the dryer. A retaining flange extending from the second base plate opposite the second flue is used for slidably receiving the first base plate so as to link the first and second base plates together with their respective first and second exhaust apertures in fluid communication with each other. A handle extends from the first base plate so as to allow ergonomical handling thereof even in tight space between the dryer and the partition wall. An attachment structure allows the handle to be releasably attached to the dryer when the first and second coupling components are separated from each other.

20 Claims, 6 Drawing Sheets

DEVICE FOR COUPLING AN EXHAUST TUBE TO AN EXHAUST PORT

FIELD OF THE INVENTION

The present invention relates to the field of coupling devices and is particularly concerned with a coupling device for coupling a flexible exhaust tube to a wall mounted exhaust port.

BACKGROUND OF THE INVENTION

There exists a plurality of situations wherein inlet or outlet tubes, ducts, hoses and the like need to be releasably connected to corresponding inlet or outlet ports. One common example is found in the field of conventional household laundry dryers.

Conventional laundry dryers typically include a relatively heavy and bulky housing. The dryer housing protectively encloses a rotating drum and a heating device so that damp clothes can be tumbled by the rotating drum while being dried by the heating element. A fan also located within the dryer housing progressively evacuates a volume of vapor saturated air generated by the drying process through a dryer outlet port.

The dryer outlet port typically extends through a rear wall part of the dryer housing.

The vapor saturated air flowing out of the dryer exhaust port must be vented out of the room in which the laundry dryer is located to prevent the potential structural problems to the room and the potential health problems to its occupants associated with dampness build-up, growth of mildew and the like.

Different type of exhaust hoses, tubing, ducts and the like are conventionally used to conduct substantial quantities of heated moist air and residual lint from conventional laundry dryers to corresponding room exhaust ports that lead to an external location. Most room exhaust port extend through a wall of a room in which the laundry dryer is located adjacent the latter. A vent is also sometimes provided by removing a window pane for installation of the latter. Regardless of the type of room exhaust port, a suitable hose or tubing is typically installed to interconnect the dryer outlet port to the room outlet port for evacuating the warm moist air and associated residual lint to an outside volume of ambient air.

To prevent several types of unfortunate situations, care must be brought in installing the exhaust tubing and in sealing both ends of the latter. Indeed, if both ends of the exhaust tubing are not properly sealed respectively to the dryer outlet port and the wall outlet port, moist air and/or associated residual lint will escape resulting in mildew, dust and the like with the associated potential health and/or structural damages.

Also, because of the amount of thermal energy involved in the vented air and in the dryer itself, improper exhaust tubing installation may create a fire hazard. Indeed, a kinked or crushed exhaust tubing could create an undesirable air flow restriction causing reduced velocity resulting in lint built-up in locations of reduced velocity. This lint built-up constitutes combustible material in the event of a fire in the dryer.

This type of problem has become particularly prevalent with the popular accordion type vinyl ducts. Indeed, vinyl ducts in particular tend to collect lint along their length when kinked. Moreover, vinyl ducts are made of combustible material. Hence, if a fire should occur in the dryer, it cannot be contained by the exhaust tubing.

A main difficulty in installing laundry dryer exhaust tubing is the limited space available to do the work. Laundry dryers typically are fitted into a space just wide enough to accommodate them. They are typically straddled by walls, a washing machine, a cabinet, a shelving or the like. Typically, therefore, it is practically impossible to make the vent connection after the laundry dryer is in its operational position typically proximate the wall through which the wall exhaust port extends.

Making the connection when the dryer is still spaced several feet from the adjacent wall too often result in not being able to get the laundry dryer close to the adjacent wall after the installation or, if it pushed close to the adjacent wall, the exhaust conduit sometimes gets crushed, kinked and/or flattened resulting in poor air flow. This problem has been further compounded in recent years due to a tendency to place dryers in small closets.

Kinking, bending or otherwise altering the shape of the exhaust conduit, not only potentially creates the hereinabove mentioned drawbacks but also potentially greatly decreases the efficiency of the dryer. Hence, in spite of the initial efficiency of the dryer as manufactured, and the theoretical connection to a freely flowing exhaust, in practice dryers may well not achieve this type of efficiency and moreover, the dryer and/or the vent duct are susceptible to overheating because of inadequate air flow through the vent system, and collection of combustible lint. This type of problem presents itself not only during installation but also when maintenance or replacement of the drying machine is required or when maintenance or cleaning operations need to be performed around the drying machine requiring displacement of the latter.

Several structures have been proposed in the prior art attempting to circumvent the hereinabove mentioned problems. For example, U.S. Pat. No. 4,334,461 naming Archer Ferguson and George Spectors as inventors issued Jun. 15, 1982 discloses a portable window vent screen that includes an aperture extending therethrough. A ventilator is positioned adjacent the outer surface of the vent screen bolted to an adapter on its inner surface. A flexible hose from a dryer is detachably attachable to the adapter whenever the dryer is used.

The dryer vent disclosed in U.S. Pat. No. 4,334,461 however suffers from being destined to be used only through window screens or the like. It is not adapted for use with conventional wall outlet ports typically located adjacent the intersection between the rear and bottom walls part of the dryer housing.

U.S. Pat. No. 5,257,468 naming Mario Lebrun as inventor, issued Nov. 2, 1993 discloses a dryer air outlet hose coupling. The coupling includes a first coupler having a cylindrical flue releasably anchored to the drying machine back wall, while a second coupler includes a cylindrical flue anchored to the laundry room floor. In one embodiment, the flues are both horizontal while in a second embodiment the flues are vertical. In a third embodiment, one hose coupler is slidable along a ground rail integral to the second hose coupler, the latter being fixed to the ground. An operative position is defined, where the cylindrical flues of the two hose couplers become coaxial to one another. In all cases, by displacing the dryer towards the second coupler, the latter will engage edgewisely the first coupler to become coaxial therewith. A first flexible hose interconnects the first flue to the machine air outlet port, while a second flexible hose interconnects the second flue to the outside.

The structures disclosed in U.S. Pat. No. 5,257,468 suffer from numerous drawbacks including the fact that in order for the coupling device to work the wall or floor mounted outlet port must be positioned in register with the dryer housing. This limits the use of the disclosed coupling device to very specific situations. Also, the disclosed coupling device is such that in order to connect or disconnect the dryer to the outside exhaust port the heavy and cumbersome dryer housing must be displaced. This can prove to be particularly tedious in situations wherein disconnecting the coupling device is frequently performed for cleaning around the dryer, emptying the device from lint or other purposes.

Furthermore, the disclosed coupling device is inherently bulky and thus forms an obstructing structure which can prove to be particularly annoying in situations, for example, wherein a broom or similar cleaning device needs to be inserted between the laundry dryer and the adjacent partition wall and/or floor. Still further, the disclosed coupling device requires mounting of components to the dryer which can alter the external appearance thereof. Accordingly, there exists a need for an improved coupling device.

Advantages of the present invention includes that the proposed coupling device allows for releasable coupling of conventional flexible exhaust tubes to conventional exhaust ports. The proposed device allows for coupling and uncoupling between the flexible exhaust tube and the wall exhaust port when the dryer is in its operational position even when the dryer housing back wall is located proximal to the adjacent partition wall thus reducing the risk of kinking, crushing, flattening or otherwise altering the flexible exhaust tube which may, in turn, result in poor air flow with concurrent risks of reducing the efficiency of the dryer and/or creating a fire hazard.

Furthermore, the exhaust tube can be readily connected and disconnected to and from the wall exhaust port without the need to move the laundry dryer even when the latter is in its operational position. The proposed device allows for ergonomical manipulation thereof so as to facilitate coupling and uncoupling not only during initial installation but in other situations such as during maintenance, cleaning or the like.

The proposed coupling device is specifically designed so as to provide a seal-tight connection between the flexible exhaust tube and the wall mounted exhaust port. Another advantage of the present invention resides in that it allows for connection of the flexible exhaust tube to a wall exhaust port located out of register with the projection of the laundry dryer on the partition wall. Still further, the proposed structure is specifically designed so as to be manufacturable using conventional forms of manufacturing so as to produce a coupling device which will be economically feasible, long lasting and relatively trouble free in operation.

SUMMARY OF THE INVENTION

In accordance with an embodiment of the invention, there is provided a coupling device for coupling a flexible exhaust tube to a wall mounted wall exhaust port, the exhaust tube defining an exhaust tube first longitudinal end and a longitudinally opposed exhaust tube second longitudinal end, the exhaust tube first longitudinal end being attachable to a dryer outlet port used for discharging a volume of drying air out of a drying machine, the coupling device comprising: a first coupling component, the first coupling component defining a first base plate, the first base plate defining a first base plate first surface and an opposite first base plate second surface, the first base plate having a first exhaust aperture extending therethrough, the first exhaust aperture defining a first exhaust aperture peripheral edge; an exhaust tube attaching means for attaching the exhaust tube second longitudinal end to the first base plate with the exhaust tube second longitudinal end in fluid communication with the first exhaust aperture; a second coupling component, the second coupling component defining a second base plate, the second base plate defining a second base plate first surface and an opposite second base plate second surface, the second base plate having a second exhaust aperture extending therethrough, the second exhaust aperture defining a second exhaust aperture peripheral edge; a wall mounting means for mounting the second coupling component to the partition wall with the second exhaust aperture in fluid communication with the wall exhaust port; a releasable linking means for releasably linking together the first and second coupling components with the first and second exhaust apertures in fluid communication with each other; a handle means extending from the first coupling component for facilitating handling of the first coupling component; wherein the first and second exhaust apertures are to be brought in and out of fluid communication with each other respectively between an operative and an inoperative position using the handle means; whereby when the exhaust tube first longitudinal end is in fluid communication with the dryer outlet port, the second coupling component is in fluid communication with the wall exhaust port and the first and second exhaust apertures are in the operative position the exhaust tube is able to carry the volume of drying air to the wall exhaust port so as to discharge the volume of drying air to a volume of outside ambient air.

Preferably, the releasable linking means includes a retaining flange extending from the second base plate first surface, the retaining flange being configured and sized for slidably receiving at least a retaining portion of the first base plate.

Conveniently, the retaining flange has a generally "L"-shaped cross sectional configuration, the retaining flange and the second base plate together defining a retaining channel having a generally "U"-shaped cross sectional configuration.

Preferably, the retaining channel has a substantial "U"-shaped general configuration defining a channel base segment and a pair of channel guiding segments, the channel base segment defining a pair of opposed base end sections, each of the channel guiding segments defining a guiding segment first end section and an opposed guiding segment second end section, each of the guiding segment first end sections extending from a base segment end section such that the guiding segments are in a predetermined spaced relationship relative to each other and the guiding segment second end sections define an entry spacing therebetween, the entry spacing being positioned substantially opposite the channel base segment.

Preferably, the coupling device also includes a friction enhancing means for enhancing a frictional retaining force created between the retaining channel and the retaining portion of the first base plate when the retaining portion of the first base plate is slidably inserted within the retaining channel.

Conveniently, the friction enhancing means includes at least one friction flange extending substantially perpendicularly from the first base plate first surface, the friction flange being configured and sized for frictionally abutting against one of the guiding segments when the retaining segment is inserted within the retaining channel.

Preferably, the friction flange has a substantially wedge shaped general configuration and the guiding segment also has a generally wedge shaped configuration tapering towards the base segment, the guiding segment being configured and sized for frictionally contacting the friction flange when the retaining segment is inserted within the retaining channel.

Conveniently, the exhaust tube attaching means includes a tube attaching flue extending from the first base plate first surface adjacent the first exhaust aperture peripheral edge, the exhaust tube attaching flue being configured and sized for receiving the exhaust tube second longitudinal end.

Preferably, the wall exhaust port includes a wall exhaust aperture extending at least partially through the partition wall and the wall mounting means includes a wall mounting flue extending from the second base plate second surface adjacent the second exhaust aperture peripheral edge, the wall mounting flue being configured and sized for at least partial insertion in the wall exhaust aperture.

Conveniently, coupling device is further provided with a device-to-dryer attachment means for releasably attaching the coupling device to the laundry dryer when the first and second coupling components are separated from each other.

Preferably, the handle means as a generally elongated configuration defining a handle longitudinal axis, a handle first longitudinal end and a handle second longitudinal end, the device-to-dryer attachment means including a device-to-dryer first attachment component mounted on the handle means adjacent the handle first longitudinal end and a device-to-dryer second attachment component mounted on the dryer, the device-to-dryer first and second attachment components being adapted to cooperate together for releasably attaching the handle means to the drying machine.

Conveniently, the device-to-dryer first and second attachment components respectively include first and second strips of miniature hook and loop fibers.

Preferably, the handle means is provided with a handle-to-first coupling component attachment means for releasably attaching the handle second longitudinal end to the first coupling component.

Conveniently, the handle means is provided with a handle length adjustment means for allowing selective adjustment of the length of the handle means.

Preferably, the handle is longitudinally divided into detachable handle sub-units, adjacent handle sub-units being provided with at least one pair of cooperating tongue and groove, the tongue being configured and sized for slidable insertion in an adjacent groove in a direction substantially perpendicular to the handle longitudinal axis, the handle length adjustment means also including a locking collar slidably mounted on the handle means so as to slide between a collar locked configuration wherein it overrides a tongue inserted within a groove lockingly preventing withdrawal therefrom and a collar unlocked configuration wherein the collar allows withdrawal of the tongue from the groove.

In accordance with the present invention, there is also provided a coupling device for coupling a flexible exhaust tube to a wall mounted wall exhaust port, the exhaust tube defining an exhaust tube first longitudinal end and a longitudinally opposed exhaust tube second longitudinal end, the exhaust tube first longitudinal end being attachable to a dryer outlet port used for discharging a volume of drying air out of a drying machine, the drying machine having a dryer housing defining a housing front wall and a housing rear wall, the dryer outlet port extending from the housing rear wall, the coupling device comprising: a first coupling component, the first coupling component defining a first base plate, the first base plate defining a first base plate first surface and an opposite first base plate second surface, the first base plate having a first exhaust aperture extending therethrough, the first exhaust aperture defining a first exhaust aperture peripheral edge; an exhaust tube attaching means for attaching the exhaust tube second longitudinal end to the first base plate with the exhaust tube second longitudinal end in fluid communication with the first exhaust aperture; a second coupling component, the second coupling component defining a second base plate, the second base plate defining a second base plate first surface and an opposite second base plate second surface, the second base plate having a second exhaust aperture extending therethrough, the second exhaust aperture defining a second exhaust aperture peripheral edge; a wall mounting means for mounting the second coupling component to the partition wall with the second exhaust aperture in fluid communication with the wall exhaust port; a releasable linking means for releasably linking together the first and second coupling components with the first and second exhaust apertures in fluid communication with each other; an elongated handle extending from the first coupling component, the handle being sized so as to allow an intended user positioned adjacent the housing front wall to manually displace the first coupling component between an operative and an inoperative position respectively wherein the first and second exhaust apertures are to be brought in and out of fluid communication with each other; whereby when the exhaust tube first longitudinal end is in fluid communication with the dryer outlet port, the second coupling component is in fluid communication with the wall exhaust port and the first and second exhaust apertures are in the operative position the exhaust tube is able to carry the volume of drying air to the wall exhaust port so as to discharge the volume of drying air to a volume of outside ambient air.

In accordance with the present invention, there is further provided a method for coupling and uncoupling a flexible exhaust tube to and from a wall mounted wall exhaust port by using a coupling device, the exhaust tube defining an exhaust tube first longitudinal end and a longitudinally opposed exhaust tube second longitudinal end, the exhaust tube first longitudinal end being attachable to a dryer outlet port used for discharging a volume of drying air out of a drying machine, the drying machine having a dryer housing defining a housing front wall and a housing rear wall, the dryer outlet port extending from the housing rear wall, the coupling device comprising a first coupling component, the first coupling component defining a first base plate, the first base plate defining a first base plate first surface and an opposite first base plate second surface, the first base plate having a first exhaust aperture extending therethrough, the first exhaust aperture defining a first exhaust aperture peripheral edge; an exhaust tube attaching means for attaching the exhaust tube second longitudinal end to the first base plate with the exhaust tube second longitudinal end in fluid communication with the first exhaust aperture; a second coupling component, the second coupling component defining a second base plate, the second base plate defining a second base plate first surface and an opposite second base plate second surface, the second base plate having a second exhaust aperture extending therethrough, the second exhaust aperture defining a second exhaust aperture peripheral edge; a wall mounting means for mounting the second coupling component to the partition wall with the second exhaust aperture in fluid communication with the wall exhaust port; a releasable linking means for releasably linking together the first and second coupling components with the first and second exhaust apertures in fluid communication with each other; an elongated handle extending from the first coupling component, the method including the steps of: positioning oneself adjacent the dryer housing front wall; manually grasping the handle; using the handle to manually displace the first coupling component between an operative and an inoperative position respectively wherein the first and second exhaust apertures are to be brought in and out of fluid communication with each other.

BRIEF DESCRIPTION OF THE DRAWINGS

An embodiment of the present invention will now be disclosed, by way of example, in reference to the following drawings in which.

DETAILED DESCRIPTION

Figure 1:
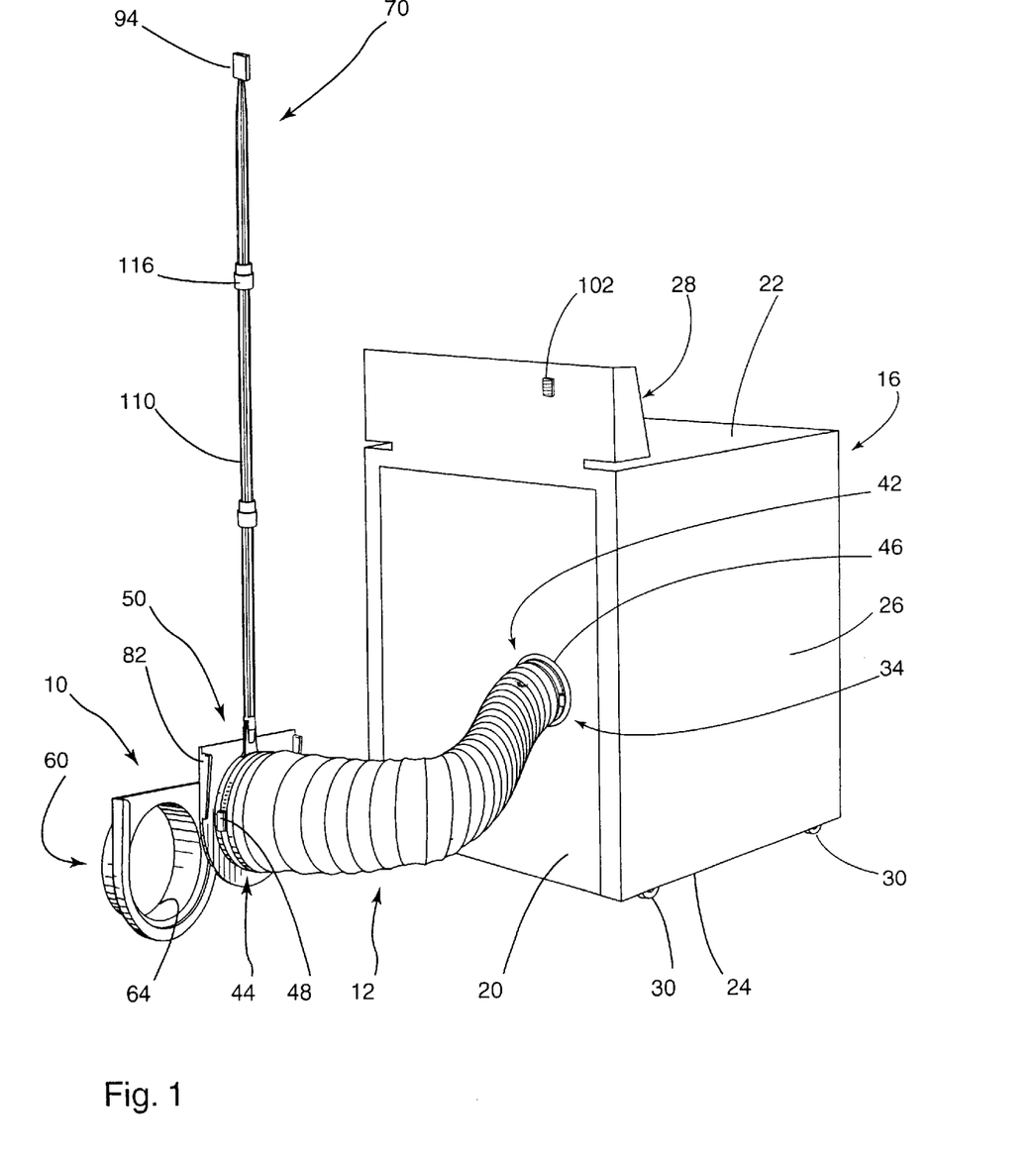
FIG. 1, in a perspective view, illustrates a coupling device in accordance with an embodiment of the present invention mounted to a dryer exhaust port part of a conventional laundry dryer.
Figure 1A:
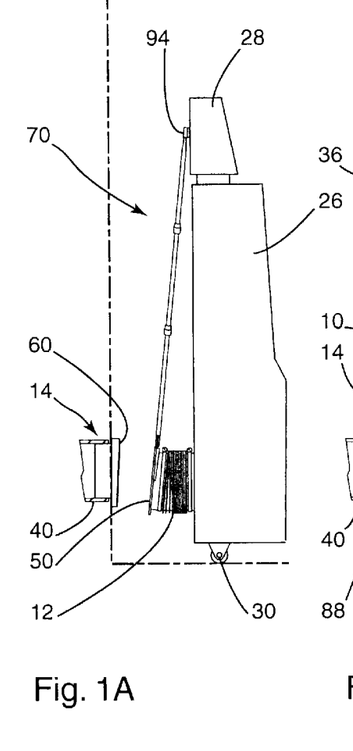
FIG. 1a, in a partial elevational view with sections taken out, illustrates a coupling device in accordance with an embodiment of the present invention, with one of its coupling components mounted to a partition wall and another one of its coupling components in an inoperative position attached to the rear wall of a conventional laundry dryer housing.
Figure 1B:
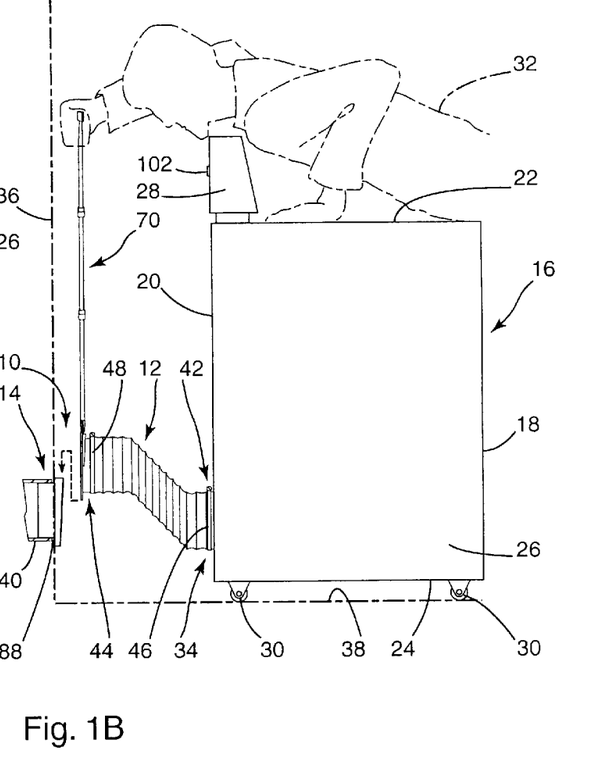
FIG. 1b, in a side view, illustrates an intended user about to use a coupling device in accordance with an embodiment of the present invention to couple a conventional flexible exhaust tube to a wall mounted exhaust port.

Referring to FIG. 1b, there is shown a coupling device 10 in accordance with an embodiment of the present invention. The coupling device 10 is shown with its components about to be joined together for coupling a conventional dryer flexible exhaust duct 12 to a wall exhaust port 14 extending through a partition wall 36.

The exhaust duct 12 is shown attached to a conventional laundry dryer 16. The laundry dryer 16 typically defines a relatively bulky and box like dryer housing having a housing front wall 18, a housing rear wall 20, a housing top wall 22, a housing bottom wall 24 and a pair of opposite housing side walls 26 (only one of which is shown in FIG. 1d).

A controlled panel 28 conventionally extends from the housing top wall 22 adjacent the housing rear wall 20. A set of swivel casters 30 are preferably attached to the housing bottom wall 22 so as to rollably support the dryer housing on a ground surface 38. Access to the close loading area within the dryer housing is typically obtained through a loading door (not shown) hingedly mounted to the housing front wall 18 or the housing top wall 22.

The control panel 28 enables an intended user 32 to activate a heating device and to operate a rotating drum both located within the dryer housing so as to dry damp clothes being tumbled by the rotating drum. A fan also located within the dryer housing progressively evacuates a volume of water vapor saturated air generated by the drying process through a dryer outlet port 34. The dryer outlet port 34 typically extends through the housing rear wall 20 adjacent the housing bottom wall 24.

The dryer outlet port 34 conventionally includes a cylindrical tubular dryer port extension (not shown) protruding substantially perpendicularly from the housing rear wall 20.

Similarly, the wall exhaust port 14 typically includes a cylindrical tubular wall port extension 40 leading away from the partition wall 36. The wall port extension 40 is typically fluidingly connected to an exterior exhaust duct (not shown) for guiding the moist air emanating from the laundry dryer 16 to a volume of outside ambient air.

The dryer exhaust duct 12 is provided for fluidingly interconnected the dryer outlet port 34 to the wall exhaust port 14. The dryer exhaust duct 12 has a generally elongated and tubular configuration defining a dryer exhaust duct first longitudinal end 42 and an opposed dryer exhaust duct second longitudinal end 44. The dryer exhaust duct first longitudinal end 42 is typically telescopically slid over the dryer port extension and secured thereto using a first conventional annular duct clamp 46.

An exhaust duct-to-coupling device attachment means for attaching the dryer exhaust duct second longitudinal end 44 to the coupling device 10 is typically provided. In one embodiment of the invention, the dryer duct-to-coupling device attachment means includes a second conventional annular duct clamp 48.

Figure 2:
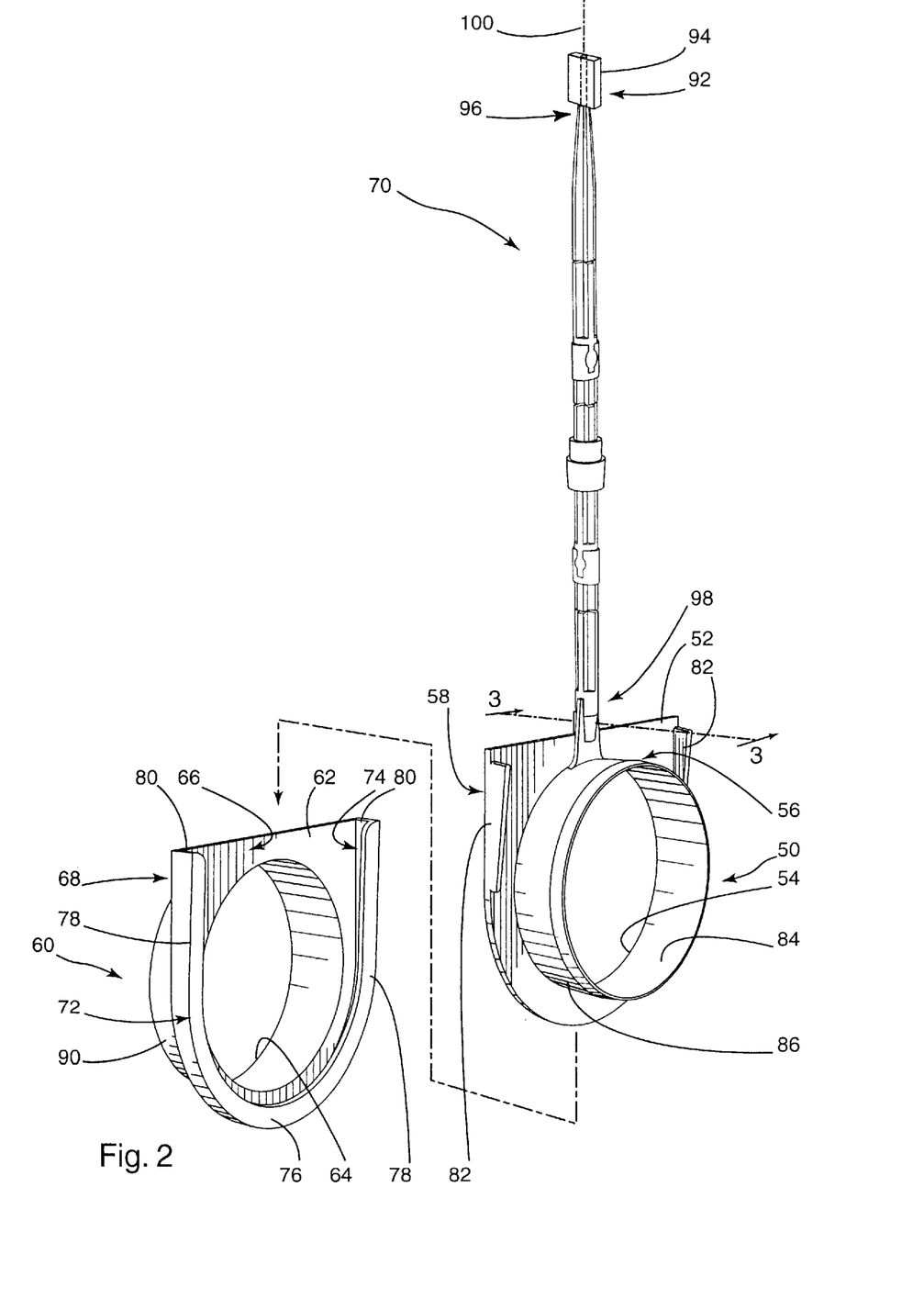
FIG. 2, in a perspective view, illustrates a coupling device in accordance with an embodiment of the present invention.

Referring now more specifically to FIG. 2, there is shown in greater details the coupling device 10. The coupling device 10 includes a first coupling component 50 defining a first base plate 52 having a first exhaust aperture 54 extending therethrough. The first base plate 52 also defines a first base plate first surface 56 and an opposed first base plate second surface 58.

The coupling device 10 also includes an exhaust tube attaching means for attaching the exhaust tube second longitudinal end 44 to the first base plate 52 with the exhaust tube second longitudinal end 44 in fluid communication with the first exhaust aperture 54.

The coupling device 10 further includes a second coupling component 60 defining a second base plate 62 having a second exhaust aperture 64 extending therethrough. Similarly, the second base plate 62 defines a second base plate first surface 66 and an opposed second base plate second surface 68.

The coupling device 10 still further includes a wall mounting means for mounting the second coupling component 60 to the partition wall 36 with the second exhaust aperture 64 in fluid communication with the wall exhaust port 40.

The coupling device 10 also includes a releasable linking means for releasably linking together the first and second coupling components 50, 60 with the first and second exhaust apertures 54, 64 in fluid communication with each other. The coupling device 10 still further includes a handle means 70 extending from the first coupling component 50 for facilitating handling thereof.

The releasable linking means includes a retaining flange 72 extending from the second base plate first surface 66. The retaining flange 72 is configured and sized for slidably receiving at least a portion of a so-called retaining portion of the first base plate 52.

The retaining flange 72 preferably has a generally "L" shaped cross sectional configuration. The retaining flange 72 and the second base plate 62 thus together define a retaining channel 74 having a generally "U" shaped cross sectional configuration.

The retaining channel 74 preferably has a substantially "U" shaped general configuration defining a channel base segment 76 and a pair of channel guiding segments 78. The channel base segment 76 defines a pair of opposed base segment end sections. Each of the channel guiding segments 78 defines a guiding segment first end section and an opposed guiding segment second end section.

Each of the guiding segments first end section extends from a base segment end section such that the guiding segments 78 are in a predetermined spaced relationship relative to each other and the guiding segment second end sections define an entry spacing 80 therebetween. The entry spacing 80 is preferably positioned opposite the channel base segment 76.

The coupling device 10 also includes a friction enhancing means for enhancing the frictional retaining force between the retaining channel 74 and the so-called retaining portion of the first base plate 52. The friction enhancing means typically includes at least one and preferably two friction flanges 82 extending substantially perpendicularly from the first base plate first surface 56. The friction flanges 82 are configured and sized for frictionally abutting against the corresponding guiding segment 78 when the so-called retaining segment of the first base plate 52 is inserted within the retaining flange 74.

Preferably, each friction flange 82 has a generally wedge shaped general configuration. Also, preferably, each guiding segment has a correspondingly longitudinally generally wedge shaped configuration tapering towards the base segment 76 that is configured and sized for frictionally contacting a corresponding friction flange 82 when the so-called retaining segment is inserted within the retaining flange 74. Preferably, both the retaining flange 72 and the friction flange 82 extend from the respective peripheral edges of the second base plate 62 and first base plate 52.

The exhaust tube attaching means preferably includes a tube attaching flue 84 extending from the first base plate first surface 56 adjacent the first exhaust aperture 54 peripheral edge. The tube attaching flue is configured and sized for receiving the exhaust tube second longitudinal end 44. The tube attaching flue 84 is typically provided with a recessed annular portion 86 adjacent its distal end.

The wall exhaust port 14 includes a wall exhaust aperture 88 extending through the partition wall 36. The wall mounting means preferably includes a wall mounting flue 90 extending from the second base plate second surface 68 adjacent the second exhaust aperture 64 peripheral edge.

The coupling device 10 is preferably further provided with a device-to-dryer attachment means 92 for releasably attaching the coupling device 10 to the laundry dryer 16 when the first and second coupling components 50, 60 are separated from each other.

The handle means 90 typically has a generally elongated configuration defining a handle first longitudinal end 96, a handle second longitudinal end 98 and a handle longitudinal axis 100 The device-to-dryer attachment means 92 includes a first attachment component 94 mounted on the handle means 70 adjacent the handle first longitudinal end 96.

The device-to-dryer attachment means 92 also includes a device-to-dryer second attachment component 102 mounted on the dryer 16 preferably on the dryer back wall 20 or the back surface of the control panel 28. The device-to-dryer first and second attachment components 94, 102 are adapted to cooperate together for releasably attaching the handle means 70 to the laundry dryer 16. The device-to-dryer first and second attachment components 94, 102 preferably include respective first and second strips of miniature hook and loop fibers commonly referred to as strips of VELCRO (a trademark).

Figures 3, 3A:
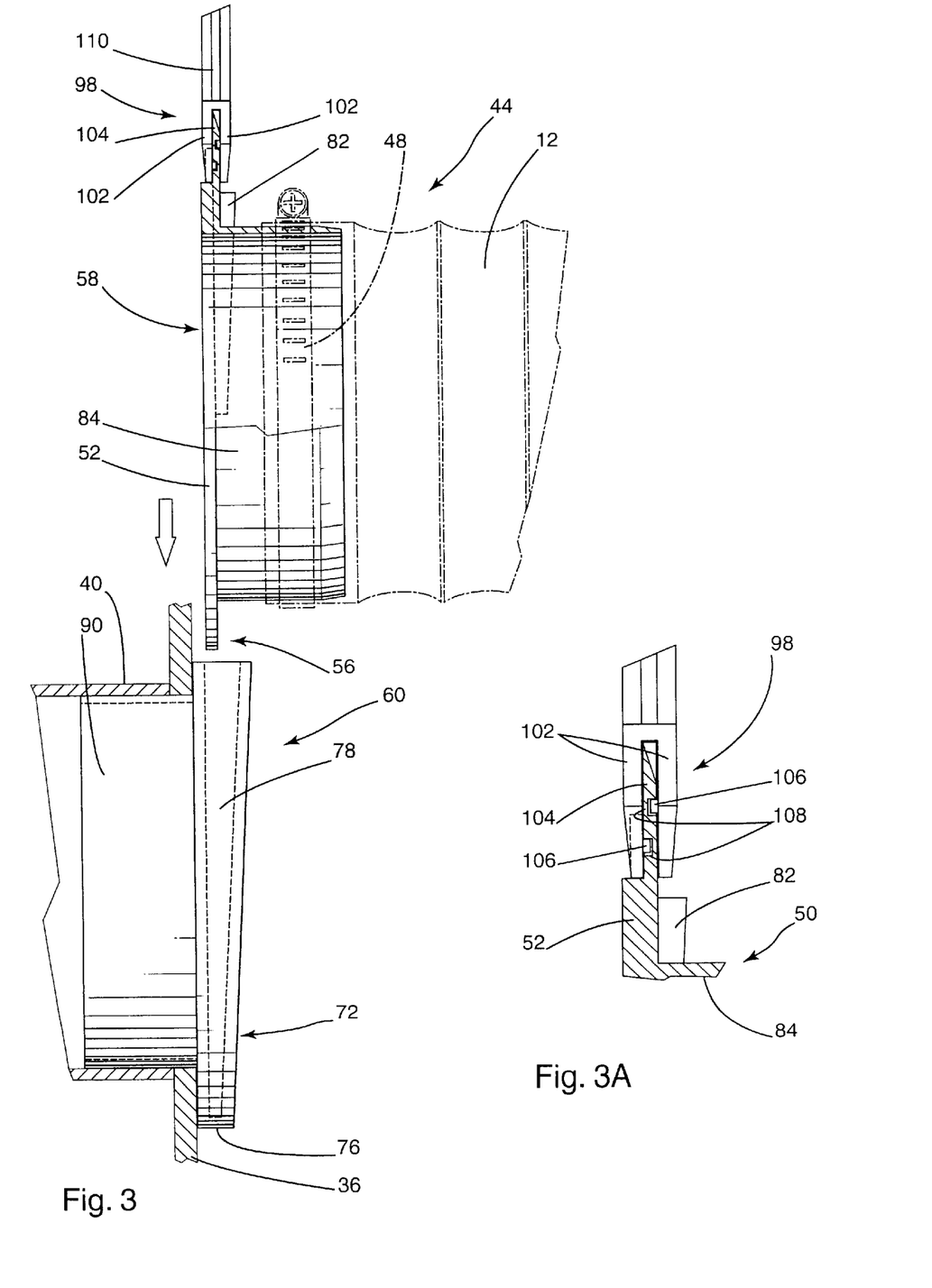
FIG. 3, in a partial cross sectional view taken along arrows III—III of FIG. 2, illustrates part of a coupling device in accordance with an embodiment of the present invention about to be positioned in an operative configuration.
FIG. 3a, in a close-up detailed cross sectional view, illustrates a connection between a handle component and a coupling component both part of a coupling device in accordance with an embodiment of the present invention.
Figure 4:
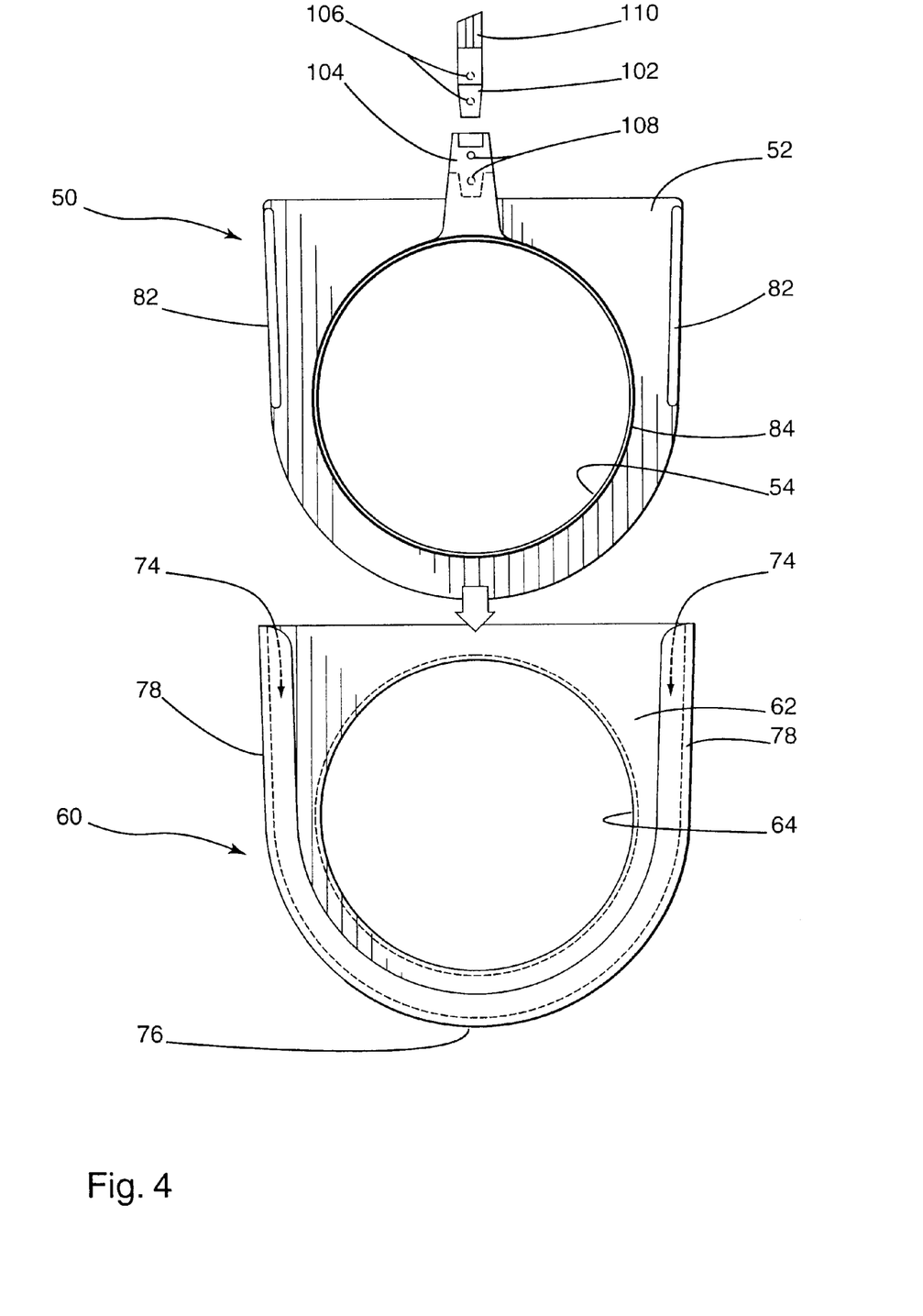
FIG. 4, in a partial elevational view, illustrates a first and a second coupling component both part of a coupling device in accordance with an embodiment of the present invention about to be assembled in an operative configuration.

As shown in greater details in FIG. 3a, the handle mean 70 is preferably provided with a handle-to first coupling component attachment means for releasably attaching the handle second longitudinal end 98 to the first coupling component 50. The handle-to first coupling component attachment means typically includes a pair of tines 102 extending from the handle second longitudinal end 98.

The tines 102 define a tine spacing therebetween configured and sized for slidably receiving an attachment tongue 104 extending from the first base plate 52. A set of locking prongs 106 extending from an inner surface of the tines 102 is adapted to cooperate with corresponding locking recesses 108 formed in the tongue 104 for snappingly and releasably locking the handle means 70 to the first coupling component 50.

Figure 5:
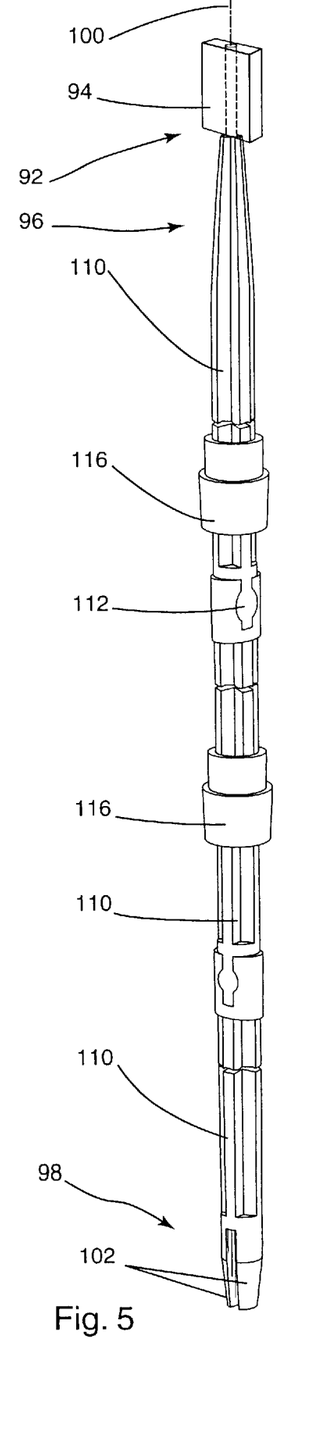
FIG. 5, in a perspective view with sections taken out, illustrates the handle component part of a coupling device in accordance with an embodiment of the present invention.

The handle means 70 is preferably provided with a handle length adjustment means for allowing selective adjustment of the length thereof. As shown in greater details in FIGS. 5 through 7, the handle length adjustment means typically includes detachable handle sub-units 110.

Figure 6:
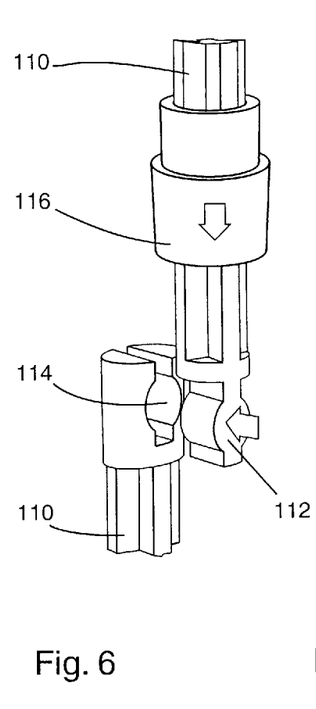
FIG. 6, in a partial perspective view with sections taken out, illustrates handle sub-unit part of the handle shown in FIG. 5 about to be assembled together.
Figure 7:
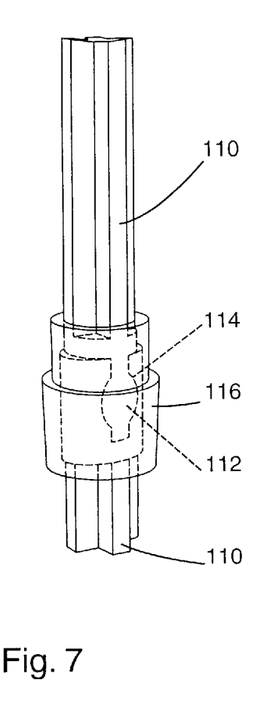
FIG. 7, illustrates the handle sub-unit shown in FIG. 6 in their assembled configuration.

Adjacent handle sub-units 110 are provided with cooperating tongues 112 and grooves 114 configured and sizes for allowing slidable insertion of the tongues 112 within the grooves 114 in a direction substantially perpendicular to the handle longitudinal axis 100. A locking collar is slidably mounted on at least one of adjacent handle sub-units 110 so as to slide between a collar locked configuration shown in FIG. 7 wherein collar 116 overrides a tongue 112 inserted within a corresponding groove 114 thus lockingly preventing relative movement therebetween and a collar unlocked configuration shown in FIG. 16 wherein it allows insertion or retraction of the tongue 112 to or from the groove 114.

In use, the duct tube first longitudinal end 42 is coupled to the laundry dryer 16 in fluid communication with the dryer outlet port 34 while the second coupling component 60 is mounted to the partition wall 36 in fluid communication with the wall exhaust port 14. The first and second exhaust apertures 54, 64 are then to be brought in and out of fluid communication with each other respectively between an operative and an inoperative position using the handle means 70.

When the first and second exhaust apertures 54, 64 are in the operative position, the exhaust tube 12 is allowed to carry the exhaust air emanating from the dryer 16 to the volume of outside ambient air. When the first and second exhaust apertures 54, 64 are in the inoperative position with the first and second coupling component 50, 60 separated from each other, the device-to-dryer attachment means can be used for releasably attaching the handle means 70 to the dryer 16 as shown in FIG. 1a.

The embodiments of the invention in which an exclusive privilege or property is claimed are defined as follows:

1. A coupling device for coupling a flexible exhaust tube to a wall mounted wall exhaust port, said exhaust tube defining an exhaust tube first longitudinal end and a longitudinally opposed exhaust tube second longitudinal end, said exhaust tube first longitudinal end being attachable to a dryer outlet port used for discharging a volume of drying air out of a drying machine, said coupling device comprising:

a first coupling component, said first coupling component defining a first base plate, said first base plate defining a first base plate first surface and an opposite first base plate second surface, said first base plate having a first exhaust aperture extending therethrough, said first exhaust aperture defining a first exhaust aperture peripheral edge;

an exhaust tube attaching means for attaching said exhaust tube second longitudinal end to said first base plate with said exhaust tube second longitudinal end in fluid communication with said first exhaust aperture;

a second coupling component, said second coupling component defining a second base plate, said second base plate defining a second base plate first surface and an opposite second base plate second surface, said second base plate having a second exhaust aperture extending therethrough, said second exhaust aperture defining a second exhaust aperture peripheral edge;

a wall mounting means for mounting said second coupling component to said partition wall with said second exhaust aperture in fluid communication with said wall exhaust port;

a releasable linking means for releasably linking together said first and second coupling components with said first and second exhaust apertures in fluid communication with each other;

a handle means extending from said first coupling component for facilitating handling of said first coupling component;

wherein said first and second exhaust apertures are to be brought in and out of fluid communication with each other respectively between an operative and an inoperative position using said handle means; whereby when said exhaust tube first longitudinal end is in fluid communication with said dryer outlet port, said second coupling component is in fluid communication with said wall exhaust port and said first and second exhaust apertures are in said operative position said exhaust tube is able to carry said volume of drying air to said wall exhaust port so as to discharge said volume of drying air to a volume of outside ambient air.

2. A coupling device as recited in claim 1 wherein said releasable linking means includes a retaining flange extending from said second base plate first surface, said retaining flange being configured and sized for slidably receiving at least a retaining portion of said first base plate.

3. A coupling device as recited claim 2 wherein said retaining flange has a generally "L"-shaped cross sectional configuration, said retaining flange and said second base plate together defining a retaining channel having a generally "U"-shaped cross sectional configuration.

4. A coupling device as recited in claim 3 wherein said retaining channel has a substantial "U"-shaped general configuration defining a channel base segment and a pair of channel guiding segments, said channel base segment defining a pair of opposed base end sections, each of said channel guiding segments defining a guiding segment first end section and an opposed guiding segment second end section, each of said guiding segment first end sections extending from a base segment end section such that said guiding segments are in a predetermined spaced relationship relative to each other and said guiding segment second end sections define an entry spacing therebetween, said entry spacing being positioned substantially opposite said channel base segment.

5. A coupling device as recited in claim 4, further comprising a friction enhancing means for enhancing a frictional retaining force created between said retaining channel and said retaining portion of said first base plate when said retaining portion of said first base plate is slidably inserted within said retaining channel.

6. A coupling device as recited in claim 5, wherein said friction enhancing means includes at least one friction flange extending substantially perpendicularly from said first base plate first surface, said friction flange being configured and sized for frictionally abutting against one of said guiding segments when said retaining segment is inserted within said retaining channel.

7. A coupling device as recited in claim 6, wherein said friction flange has a substantially wedge shaped general configuration.

8. A coupling device as recited in claim 7, wherein said guiding segment has a generally wedge shaped configuration tapering towards said base segment, said guiding segment being configured and sized for frictionally contacting said friction flange when said retaining segment is inserted within said retaining channel.

9. A coupling device as recited in claim 1, wherein said exhaust tube attaching means includes a tube attaching flue extending from said first base plate first surface adjacent said first exhaust aperture peripheral edge, said exhaust tube attaching flue being configured and sized for receiving said exhaust tube second longitudinal end.

10. A coupling device as recited in claim 1, wherein said wall exhaust port includes a wall exhaust aperture extending at least partially through said partition wall and said wall mounting means includes a wall mounting flue extending from said second base plate second surface adjacent said second exhaust aperture peripheral edge, said wall mounting flue being configured and sized for at least partial insertion in said wall exhaust aperture.

11. A coupling device as recited in claim 1, wherein coupling device is further provided with a device-to-dryer attachment means for releasably attaching said coupling device to said laundry dryer when said first and second coupling components are separated from each other.

12. A coupling device as recited in claim 11, wherein said handle means as a generally elongated configuration defining a handle longitudinal axis, a handle first longitudinal end and a handle second longitudinal end, said device-to-dryer attachment means including a device-to-dryer first attachment component mounted on said handle means adjacent said handle first longitudinal end and a device-to-dryer second attachment component mounted on said dryer, said device-to-dryer first and second attachment components being adapted to cooperate together for releasably attaching said handle means to said drying machine.

13. A coupling device as recited in claim 12, wherein said device-to-dryer first and second attachment components respectively include first and second strips of miniature hook and loop fibers.

14. A coupling device as recited in claim 13, wherein said handle means is provided with a handle-to-first coupling component attachment means for releasably attaching said handle second longitudinal end to said first coupling component.

15. A coupling device as recited in claim 12, wherein said handle means is provided with a handle length adjustment means for allowing selective adjustment of the length of said handle means.

16. A coupling device as recited in claim 15, wherein said handle is longitudinally divided into detachable handle sub-units, adjacent handle sub-units being provided with at least one pair of cooperating tongue and groove, said tongue being configured and sized for slidable insertion in an adjacent groove in a direction substantially perpendicular to said handle longitudinal axis, said handle length adjustment means also including a locking collar slidably mounted on said handle means so as to slide between a collar locked configuration wherein it overrides a tongue inserted within a groove lockingly preventing withdrawal therefrom and a collar unlocked configuration wherein said collar allows withdrawal of said tongue from said groove.

17. A coupling device for coupling a flexible exhaust tube to a wall mounted wall exhaust port, said exhaust tube defining an exhaust tube first longitudinal end and a longitudinally opposed exhaust tube second longitudinal end, said exhaust tube first longitudinal end being attachable to a dryer outlet port used for discharging a volume of drying air out of a drying machine, said drying machine having a dryer housing defining a housing front wall and a housing rear wall, said dryer outlet port extending from said housing rear wall, said coupling device comprising:

a first coupling component, said first coupling component defining a first base plate, said first base plate defining a first base plate first surface and an opposite first base plate second surface, said first base plate having a first exhaust aperture extending therethrough, said first exhaust aperture defining a first exhaust aperture peripheral edge;

an exhaust tube attaching means for attaching said exhaust tube second longitudinal end to said first base plate with said exhaust tube second longitudinal end in fluid communication with said first exhaust aperture;

a second coupling component, said second coupling component defining a second base plate, said second base plate defining a second base plate first surface and an opposite second base plate second surface, said second base plate having a second exhaust aperture extending therethrough, said second exhaust aperture defining a second exhaust aperture peripheral edge;

a wall mounting means for mounting said second coupling component to said partition wall with said second exhaust aperture in fluid communication with said wall exhaust port;

a releasable linking means for releasably linking together said first and second coupling components with said first and second exhaust apertures in fluid communication with each other;

an elongated handle extending from said first coupling component, said handle being sized so as to allow an intended user positioned adjacent said housing front wall to manually displace said first coupling component between an operative and an inoperative position respectively wherein said first and second exhaust apertures are to be brought in and out of fluid communication with each other; whereby when said exhaust tube first longitudinal end is in fluid communication with said dryer outlet port, said second coupling component is in fluid communication with said wall exhaust port and said first and second exhaust apertures are in said operative position said exhaust tube is able to carry said volume of drying air to said wall exhaust port so as to discharge said volume of drying air to a volume of outside ambient air.

18. A coupling device as recited in claim 17 wherein said releasable liking means includes a retaining flange extending from said second base plate first surface, said retaining flange being configured and sized for slidably receiving at least a retaining portion of said first base plate, said retaining flange having a generally "L"-shaped cross sectional configuration, said retaining flange and said second base plate together defining a retaining channel having a generally "U"-shaped cross sectional configuration; said coupling device also including a friction enhancing means for enhancing a frictional retaining force created between said retaining channel and said retaining portion of said first base plate when said retaining portion of said first base plate is slidably inserted within said retaining channel.

19. A coupling device as recited in claim 18 wherein said coupling device is further provided with a device-to-dryer attachment means for releasably attaching said coupling device to said laundry dryer when said first and second coupling components are separated from each other.

20. A method for coupling and uncoupling a flexible exhaust tube to and from a wall mounted wall exhaust port by using a coupling device, said exhaust tube defining an exhaust tube first longitudinal end and a longitudinally opposed exhaust tube second longitudinal end, said exhaust tube first longitudinal end being attachable to a dryer outlet port used for discharging a volume of drying air out of a drying machine, said drying machine having a dryer housing defining a housing front wall and a housing rear wall, said dryer outlet port extending from said housing rear wall, said coupling device comprising a first coupling component, said first coupling component defining a first base plate, said first base plate defining a first base plate first surface and an opposite first base plate second surface, said first base plate having a first exhaust aperture extending therethrough, said first exhaust aperture defining a first exhaust aperture peripheral edge; an exhaust tube attaching means for attaching said exhaust tube second longitudinal end to said first base plate with said exhaust tube second longitudinal end in fluid communication with said first exhaust aperture; a second coupling component, said second coupling component defining a second base plate, said second base plate defining a second base plate first surface and an opposite second base plate second surface, said second base plate having a second exhaust aperture extending therethrough, said second exhaust aperture defining a second exhaust aperture peripheral edge; a wall mounting means for mounting said second coupling component to said partition wall with said second exhaust aperture in fluid communication with said wall exhaust port; a releasable linking means for releasably linking together said first and second coupling components with said first and second exhaust apertures in fluid communication with each other; an elongated handle extending from said first coupling component, said method including the steps of:

positioning oneself adjacent said dryer housing front wall;

manually grasping said handle;

using said handle to manually displace said first coupling component between an operative and an inoperative position respectively wherein said first and second exhaust apertures are to be brought in and out of fluid communication with each other.

\* \* \* \* \*